US008814461B2

(12) United States Patent
Vine

(10) Patent No.: US 8,814,461 B2
(45) Date of Patent: Aug. 26, 2014

(54) LOCKING APPARATUS FOR AN OBJECT BEING LOCKABLE ON A RAIL

(75) Inventor: Paul Vine, Hamburg (DE)

(73) Assignee: Airbus Operations GmbH (DE)

(*) Notice: Subject to any disclaimer, the term of this patent is extended or adjusted under 35 U.S.C. 154(b) by 382 days.

(21) Appl. No.: 12/563,237

(22) Filed: Sep. 21, 2009

(65) Prior Publication Data

US 2010/0074680 A1 Mar. 25, 2010

Related U.S. Application Data

(60) Provisional application No. 61/194,073, filed on Sep. 24, 2008.

(30) Foreign Application Priority Data

Sep. 24, 2008 (DE) .................. 10 2008 048 745

(51) Int. Cl.
F16B 21/00 (2006.01)

(52) U.S. Cl.
USPC ............ 403/322.1; 403/321; 403/322.3; 403/322.4; 248/423; 244/118.6; 244/137.4

(58) Field of Classification Search
USPC ............ 410/104, 105; 248/423, 424, 503.1, 248/429; 403/322.4, 322.1, 322.3, 321; 297/344.11, 311, 341; 244/118.5, 244/118.6, 137.4
See application file for complete search history.

(56) References Cited

U.S. PATENT DOCUMENTS

| 3,620,171 | A | * | 11/1971 | Brenia et al. | 410/105 |
| 3,652,050 | A | * | 3/1972 | Marrujo et al. | 248/503.1 |
| 4,062,298 | A | * | 12/1977 | Weik | 410/105 |
| 4,771,969 | A | * | 9/1988 | Dowd | 410/105 |
| 4,911,381 | A | * | 3/1990 | Cannon et al. | 244/122 R |
| 5,337,979 | A | * | 8/1994 | Bales et al. | 244/118.1 |
| 5,489,172 | A | * | 2/1996 | Michler | 410/105 |
| 5,871,318 | A | * | 2/1999 | Dixon et al. | 410/105 |
| 6,902,365 | B1 | * | 6/2005 | Dowty | 410/105 |
| 7,021,596 | B2 | * | 4/2006 | Lory | 248/423 |
| 7,334,758 | B2 | * | 2/2008 | Williamson et al. | 244/118.6 |
| 7,455,276 | B2 | * | 11/2008 | Frey | 248/500 |

(Continued)

FOREIGN PATENT DOCUMENTS

| DE | 4115815 | C1 | 6/1992 |
| DE | 43 36 801 | C1 | 11/1994 |
| DE | 19851392 | A1 * | 5/1999 |
| EP | 0581071 | A1 | 2/1994 |

Primary Examiner — Daniel P Stodola
Assistant Examiner — Matthew R McMahon
(74) Attorney, Agent, or Firm — Lerner, David, Littenberg, Krumholz & Mentlik, LLP

(57) ABSTRACT

A locking apparatus for an object that is lockable on a rail is provided such that the object may be undone in a single manual operating step. The apparatus may be used in a passenger aircraft in which it is necessary to slide seats or other built-in devices. The apparatus includes at least one first base body, at least one first locking body, and at least one first operating element. The at least one first base body is designed to be placed on top of the rail. The at least one first locking body is movably held to the at least one first base body, and is shaped to be placed into the rail. The at least one first operating element is connected to the at least one first locking body for moving the at least one first locking body in the direction of the interior of the rail.

9 Claims, 11 Drawing Sheets

(56) References Cited

U.S. PATENT DOCUMENTS

| | | | |
|---|---|---|---|
| 7,661,637 B2 * | 2/2010 | Mejuhas et al. | 248/157 |
| 7,785,053 B2 * | 8/2010 | Hudson | 410/105 |
| 8,066,248 B2 * | 11/2011 | Christensen | 248/429 |
| 8,292,224 B1 * | 10/2012 | Ahad et al. | 244/118.6 |

* cited by examiner

LOCKING APPARATUS FOR AN OBJECT BEING LOCKABLE ON A RAIL

CROSS-REFERENCE TO RELATED APPLICATIONS

This application claims the benefit of the filing date of U.S. Provisional Patent Application No. 61/194,073 filed Sep. 24, 2008, the disclosure of which is hereby incorporated herein by reference.

BACKGROUND OF THE INVENTION

The invention relates to a locking apparatus for an object that is lockable on a rail, to the use of a locking apparatus, and to a means of transport comprising at least one such locking apparatus.

BRIEF SUMMARY OF THE INVENTION

In modern means of transport, and as a particular example in aircraft, there are a multitude of objects in a passenger cabin, which objects render traveling convenient to passengers. This includes seats, partition walls, toilets, galley elements and the like. Since it is usual during the production of an aircraft or of some other means of transport to take into account individual requirements of the customer, without constructing each passenger cabin separately, in particular the seats are variably affixed by means of rails, the so-called seat rails, that are arranged in the floor of the cabin and that extend parallel to each other. In order to change the position of a seat in a seat rail it is necessary to undo locking arrangements in the form of locking apparatuses or other locking means on the seat rail so that they may be freely slid along, for example on two seat rails that extend side by side, and may subsequently be locked on the seat rail in some other position.

In the state of the art there are a number of locking apparatuses which by means of correspondingly-formed bodies establish positive-locking and non-positive-locking connections in corresponding openings of the seat rail. These connections are usually manually operated; in other words a user needs to kneel on the floor beside the seat and needs to manually undo or attach each individual connection.

For example, DE 4336801 C1 shows a device for attaching roller conveyors in the region of seat rails of cargo holds in an aircraft, in which device all the elements used for attachment are manually inserted and operated.

All known locking apparatuses, furthermore, are associated with a disadvantage in that a single object, for example a seat or a group of seats, cannot be detached from its locked position in a single manual operating step. In each case at least two or more manual operating steps are necessary in order to open the locking apparatus and in the case of attachment to two seat rails to undo both sides of the seat.

It may therefore be an object of the invention to propose a locking apparatus for an object that may be affixed to a rail, which locking apparatus makes possible the safest possible locking of the object and which locking apparatus may be undone if at all possible in a single manual operating step.

A first important aspect of the present invention consists of the use of at least one first locking body that comprises a shape that makes it possible to put it in place in the seat rail. A base body that essentially is supported by the seat rail and that is slidable on the seat rail may be clamped to the seat rail by means of this at least one first locking body. To this effect the first locking body is movably held to the base body and is connected to an operating element so that when the operating element is operated a movement of the first locking body towards the base body or away from the base body takes place.

A seat rail that is common in modern passenger aircraft is designed in such a way that it comprises a central slit that extends in the direction of extension, which slit comprises essentially circular openings at a particular spacing, in each case at least 1 inch.

When the locking apparatus according to the present invention is undone, the seat may be moved along the seat rail by sliding action of the base body while the first locking body is located within the seat rail but does not exert any clamping force on the base body and the seat rail. Instead, the first locking body is situated between the top and the bottom of the seat rail, thus serving as a guide for the base body along the central slit in the seat rail so that there is no need for subsequent precise alignment of the seat or of some other object on the seat rail.

An advantageous improvement of the locking apparatus according to the present invention comprises in addition at least one first plunging body that is movably held on or relative to the base body. This first plunging body is also connected to the operating element so that said plunging body may move in the direction of the interior of the seat rail or out from the interior of the seat rail towards the base body. It is the role of the first plunging body to plunge into the corresponding openings in the seat rail when the seat is locked, so that movement along the seat rail (in an aircraft-fixed coordinate system essentially in the x-direction) may be prevented. In the context of the at least one first locking body, when the seat of a seat rail is locked there is thus a movement of the first locking body from the interior of the seat rail towards the base body, and a movement of the first plunging body from the base body towards the interior of the seat rail. Correspondingly, when the operating element is operated, the seat of a seat rail is at the same time clamped so as to be fixed, and by plunging of the at least one first plunging body the seat is additionally protected in a positive-locking manner against moving.

According to an advantageous improvement of the locking apparatus according to the present invention, the operating element comprises at least one connecting member in the form of at least one slit in which at least one correspondingly arranged projection of the at least one first locking body is guided. By a corresponding arrangement of the projection on the first locking body and corresponding alignment of the slit of the operating element, a desired movement of the first locking body may take place when the operating element is moved. The at least one first plunging body may also be designed in the same manner so that when the operating element is moved through a correspondingly formed slit, the plunging body is moved towards the base body to the interior of the seat rail. Such a design is advantageous as a result of the mechanically very simple construction that is essentially maintenance-free and at the same time, as a result of corresponding dimensioning of the individual components, also very robust and reliable.

In a particularly preferred manner the operating element is designed as an elongated element with an extension that is aligned so as to be essentially parallel to the extension of the base body and/or of the seat rail. In addition to this, in the direction of extension, the operating element is held so as to be movable relative to the base body. Underneath a seat that is to be attached to a seat rail, in the direction of extension of the seat rail there is usually sufficient space to accommodate mechanical elements. Such an elongated operating element would thus not disturb any other components of the locking apparatus or of the seat, so that the simplest possible design solution in the form of a piece of sheet metal or of a plate may be implemented. In such an operating element the design of the slits for guiding the at least one first locking body and/or the at least one first plunging body is mechanically also very simple because they could simply be designed as elongated holes which in each case extend at a certain angle in the operating element, wherein the respective angle determines the force that acts on the first locking body, which force results from a constant operating force.

In order to achieve clicking-in of the connection, the slits in the operating element could comprise a kink on which the direction of movement of the bodies guided therein (first locking body and/or first plunging body) could be reversed at least for a very short distance so that due to the clamping effect of the locking body, and the counterforce connected therewith, self-locking occurs. Such self-locking may be undone by corresponding operation of the operating element in the reverse direction.

In a particularly preferred manner the locking apparatus according to the present invention comprises a second base body on which a second operating element as well as at least a second locking body are movably held. This part of the locking apparatus according to the present invention could, for example, be used to lock the front of a seat or some other object in a seat rail, while the front region of the locking apparatus according to the present invention could serve to lock the rear part of a seat in the seat rail. In particular in the field of application of an aircraft, in so-called 16-g-load-tests considerably greater loads occur in the rear region of a seat attachment device than in the front region of the seat. While on a rear end of the seat strong tensile forces occur, which are directed obliquely upwards and away from the seat rail, in the front region of a seat only pressure forces occur that act on the seat rail. It would thus be possible to do without a further plunging body at the front end of the locking apparatus.

In a further advantageous improvement of the locking apparatus according to the present invention, on at least one operating element a lever is arranged that may be connected to a suitable actuator. By connecting the operating element to an actuator, with a corresponding design of the seat it is possible, for example, for simple electrical unlocking of the seat rail to take place.

Furthermore, it is particularly advantageous if in each case all the operating elements are connected with at least one lever, which operating elements may be moved by means of at least one shared actuator. This ensures that even in a multipart design of the locking apparatus according to the present invention, operating an actuator causes all the operating elements to undo all the locking bodies and plunging bodies. In this arrangement the actuator is not limited to an electrical, pneumatic or hydraulic actuator, but instead, for reasons of cost, a mechanical lever as an actuator is imaginable so that a seat or such a seat group comprising the locking apparatus according to the invention does not lead to excessive costs.

In an advantageous exemplary embodiment of the locking apparatus according to the present invention, the ends of the levers of the operating elements, which ends face away from the operating element, are arranged on a shared lever, wherein the drive lever preferably provides an attachment point of its own for each lever of the operating elements. In this way it is possible to take into account various geometric requirements in relation to the necessary forces and guide paths, in which, for example, connecting members with short guide paths and a high dynamic effect may be taken into account just as well as connecting members with long guide paths and a lesser dynamic effect.

Finally, the object is also met by the use of a locking apparatus according to the present invention for an object. Likewise, a means of transport, and in particular an aircraft comprising at least one seat, at least one seat rail, and at least one locking apparatus according to the present invention, also meets the object of the invention.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, also irrespective of their composition in the individual claims or their interrelationships. Furthermore, identical or similar components in the figures have the same reference characters. The following are shown:

DETAILED DESCRIPTION

Figure 1:
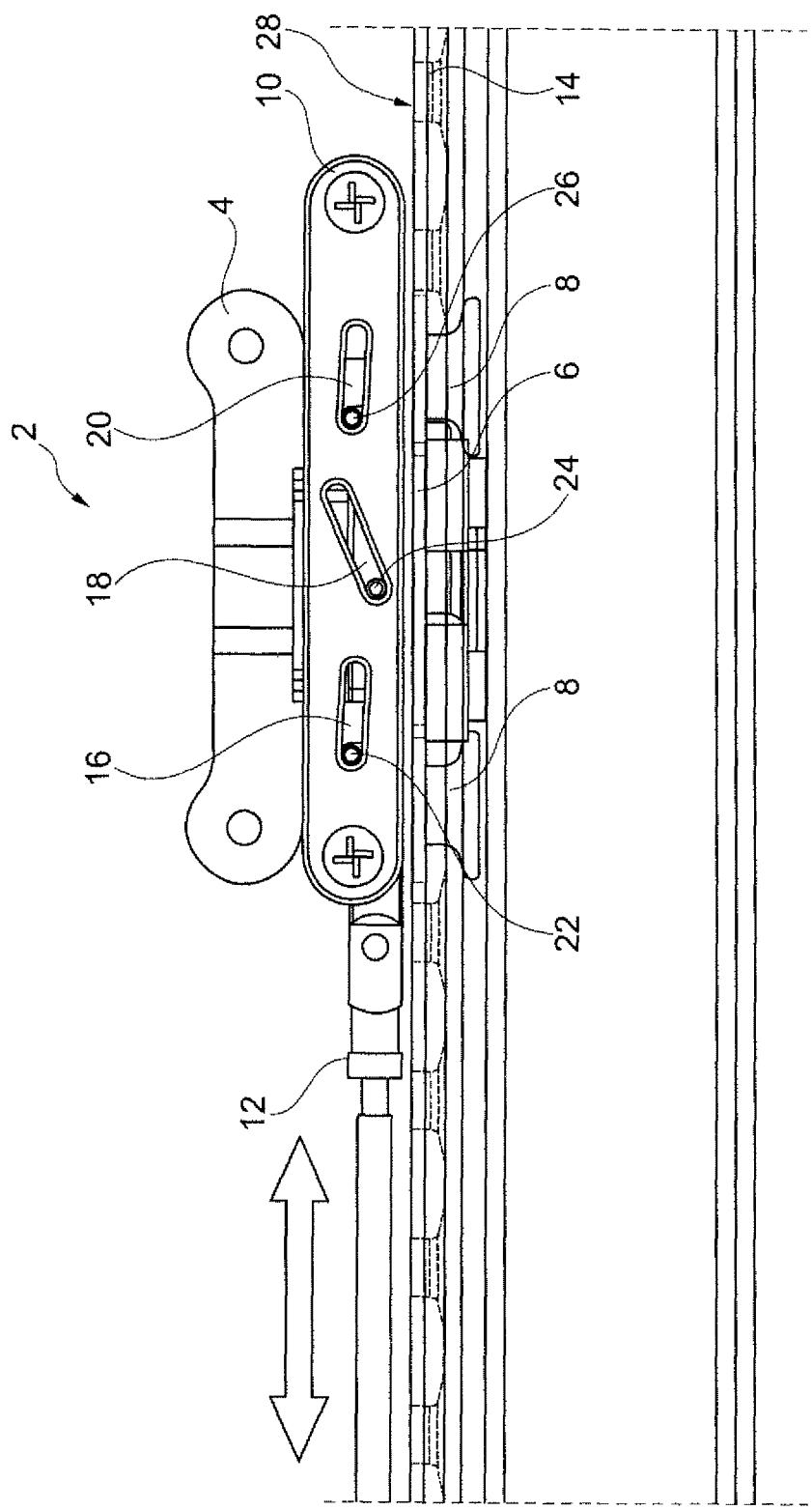
FIG. 1: a rear part of the locking apparatus according to the present invention in the closed state.

FIG. 1 shows part of the locking apparatus according to the present invention, which part is located at a rear end of the object to be locked, which object in this illustration is, for example, a seat. This region, also referred to as the "rear fitting" 2, comprises a first base body 4 on which a plunging body 6 and two first locking bodies 8 are arranged so as to be movably held. In addition, on the first base body 4 an operating element 10 is movably held and is connected to a lever 12. The lever 12 is designed to move the operating element 10 along the direction of extension of a seat rail 14. The operating element 10 furthermore comprises three connecting members in the form of slits 16, 18 and 20, in which in each case pins 22, 24 and 26 are guided. The pins 22 and 26 are connected to the first locking bodies 8, whereas the pin 24 is connected to the plunging body 6. By moving the lever 12 the first operating element 10 also moves, as a result of which the pins 22, 24 and 26 in the slits 16, 18 and are moved upwards or downwards. This guide of the connecting member causes the plunging body 6 to be lowered when the first locking body 8 is lifted, and vice versa.

In order to lock the rear fitting in the seat rail 14, the two first locking bodies 8 are within the seat rail 14 underneath its top 28 and as a result of operation of the first operating element 10 they are drawn in the direction of the top 28 or towards the first base body 4. When they reach the end position of the operating element 10, the first locking bodies 8 cause the first base body 4 to clamp against the seat rail 14. This safely avoids movement across the seat rail 14.

As a result of the shown inclination of the slits 16, 18 and 20, when the first locking body 8 is lifted, the plunging body 6 at the same time lowers itself into the seat rail 14 where it establishes a positive-locking connection between the first base body 4 and the seat rail 14 so that movement of the first base body 4 along the direction of extension of the seat rail 14 is prevented. In this way a rear end of a seat to be locked is reliably locked on the seat rail 14. By means of a single manual operating step, namely operation of the first operating element 10 or pulling or pushing the lever 12, the rear fitting 2 may be locked or released. No further manual operating steps are necessary in order to undo this locking action and in order to move the seat along the direction of extension of the seat rail 14.

Figure 2:
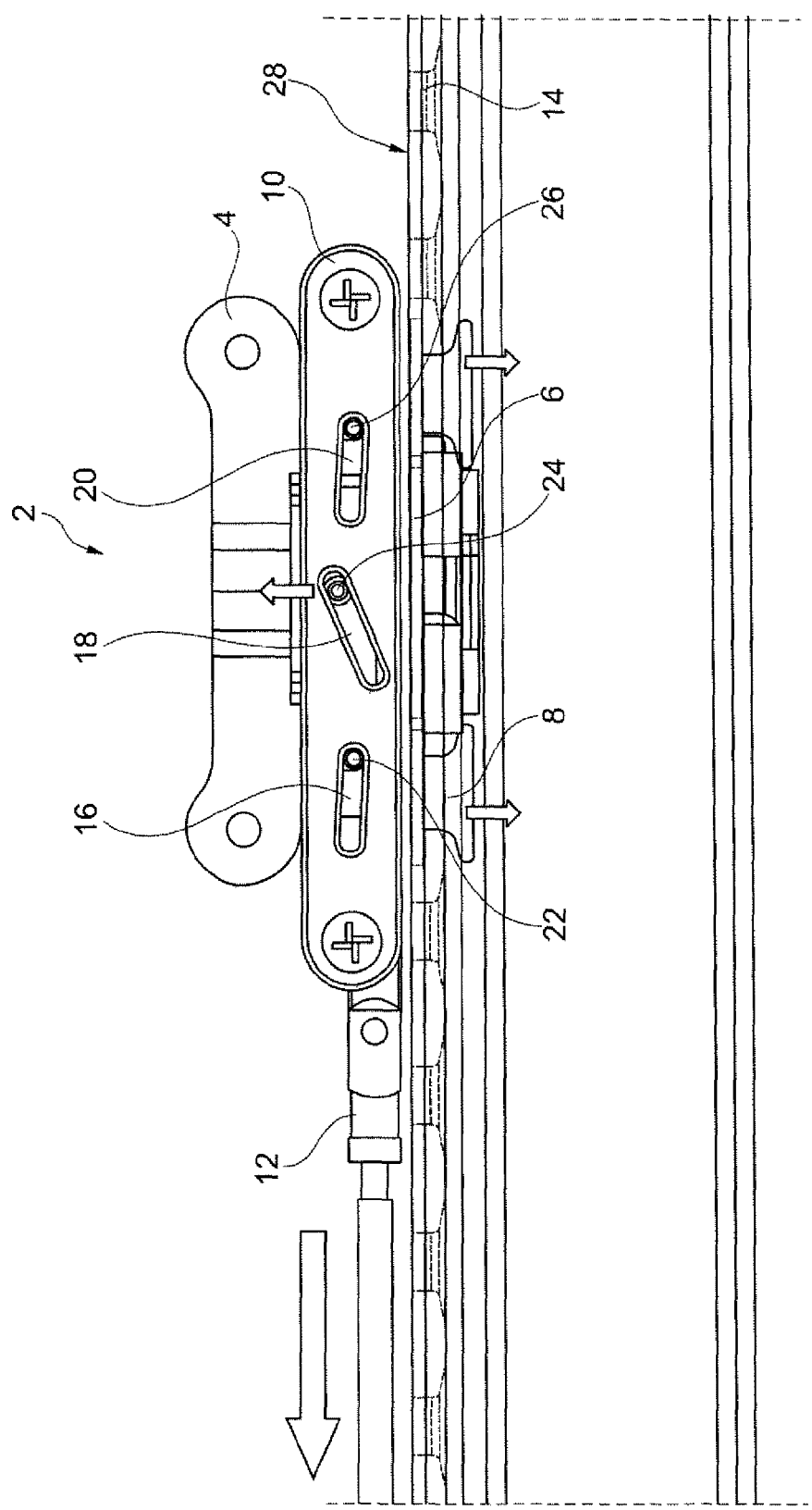
FIG. 2: a rear part of the locking apparatus according to the present invention in the open state.

FIG. 2 shows the rear fitting 2 in an unlocked or open state. The pins 22 and 26, and thus the first locking bodies 8, have moved further in the direction of the seat rail 14, whereas the pin 24, and thus also the plunging body 6, has moved from the seat rail 14 in the direction of the first base body 4. As a result of this the first locking bodies 8 may slide without hindrance within the seat rail 14, and the positive-locking connection between the plunging body 6 and the seat rail 14 is undone.

Figure 3:
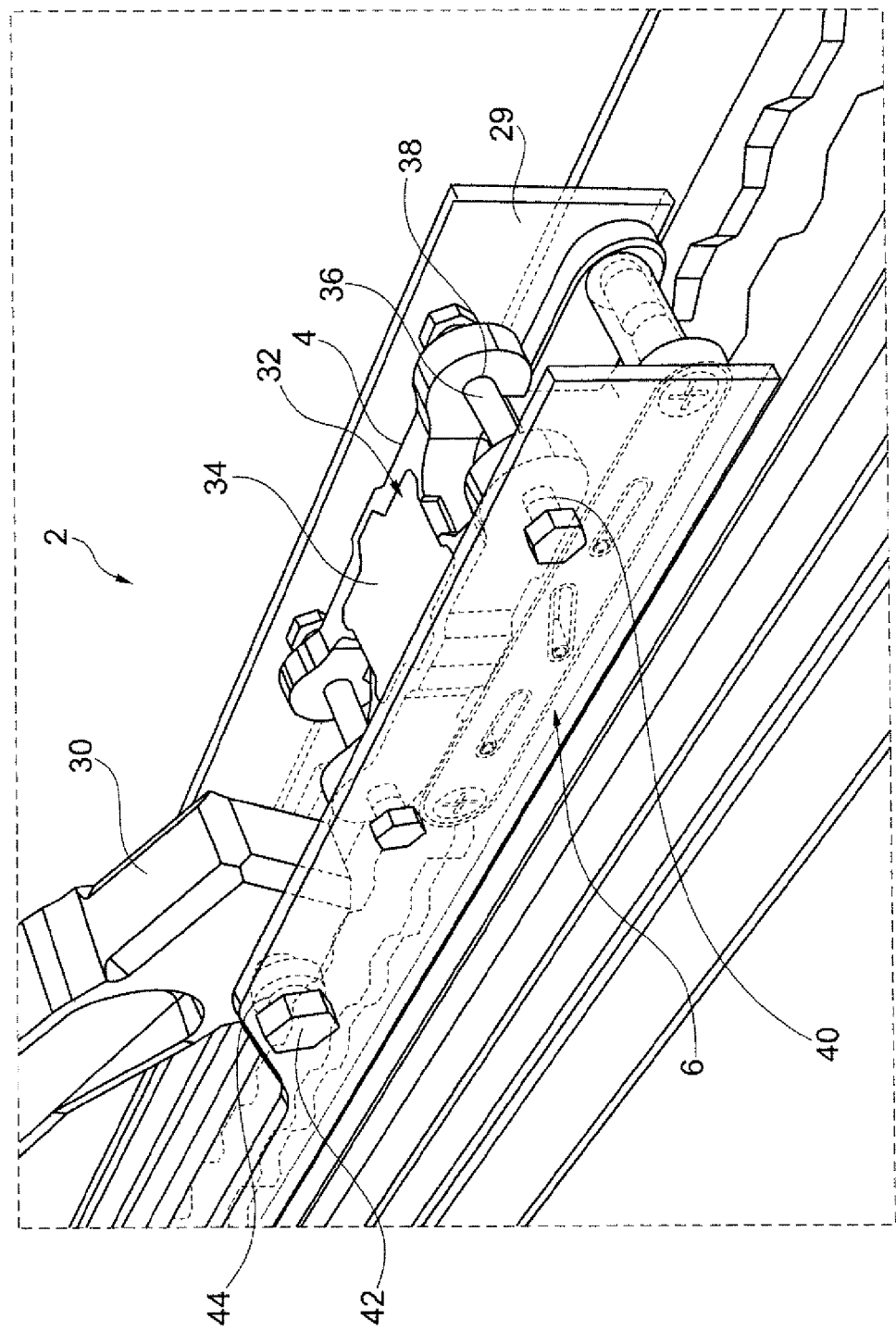
FIG. 3: a three-dimensional view of a rear part of the locking apparatus according to the present invention with a rear seat leg.

FIG. 3 shows a three-dimensional view of a rear fitting 2 that is arranged on a frame 29 that is connected to a rear seat leg 30. In an upper opening 32 the first base body comprises a cover 34 that covers the slide face for the plunging body 6, thus providing protection from dirt or dust. Attaching the first base body 4 to the frame 29 takes place, for example, by way of a bolt 36 which has been inserted through corresponding attachment means in the form of holes 38 in the first base body 4 or openings 40 in the frame 29. Likewise, the rear seat leg 30 is connected, by means of a bolt 42, to the frame 29 by way of corresponding holes 44.

Figure 4:
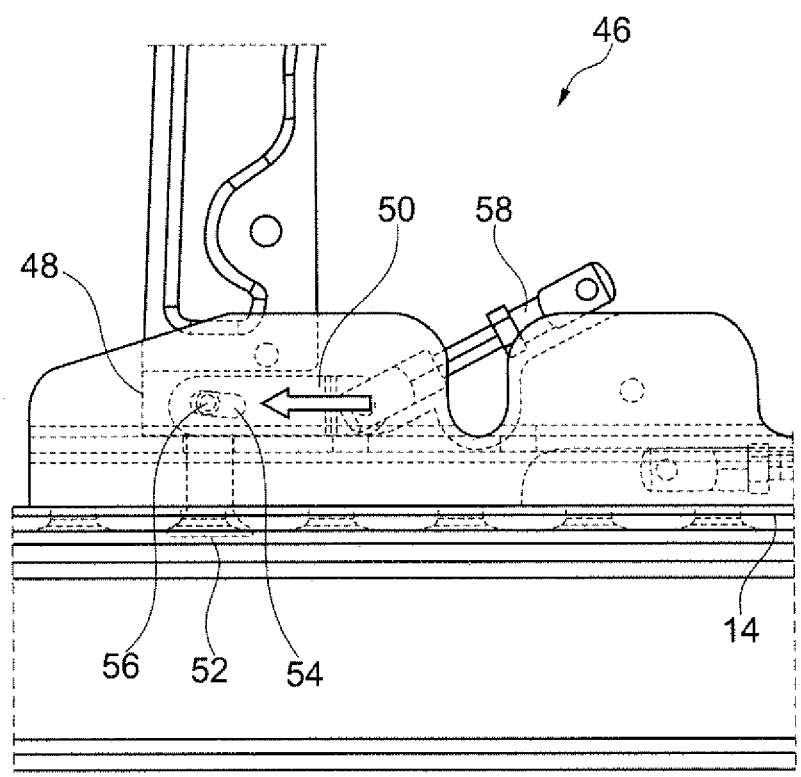
FIG. 4: a front part of the locking apparatus according to the present invention in the closed state.

FIG. 4 shows a front fitting 46 in a closed or locked state. At that location there is a second base body 48 on which a second operating element 50 and a second locking body 52 are held. In a manner similar to that of the first operating element 10 of the rear fitting 2, the second operating element 50 of the front fitting comprises a connecting member in the form of a slit 54, in which a pin 56 is guided that is connected to the second locking body 52. In the shown position in FIG. 4 the second locking body 52 is in its uppermost position so that it conforms to the seat rail 14 and in so doing presses the second base body 48 against the seat rail 14. In this way clamping of the second base body 48 and thus locking of the front end of the seat is achieved. On one end of the second operating element 50 a lever 58 is arranged which could, for example, be connected to an actuator so that the second operating element 50 could be deflected.

Figure 5:
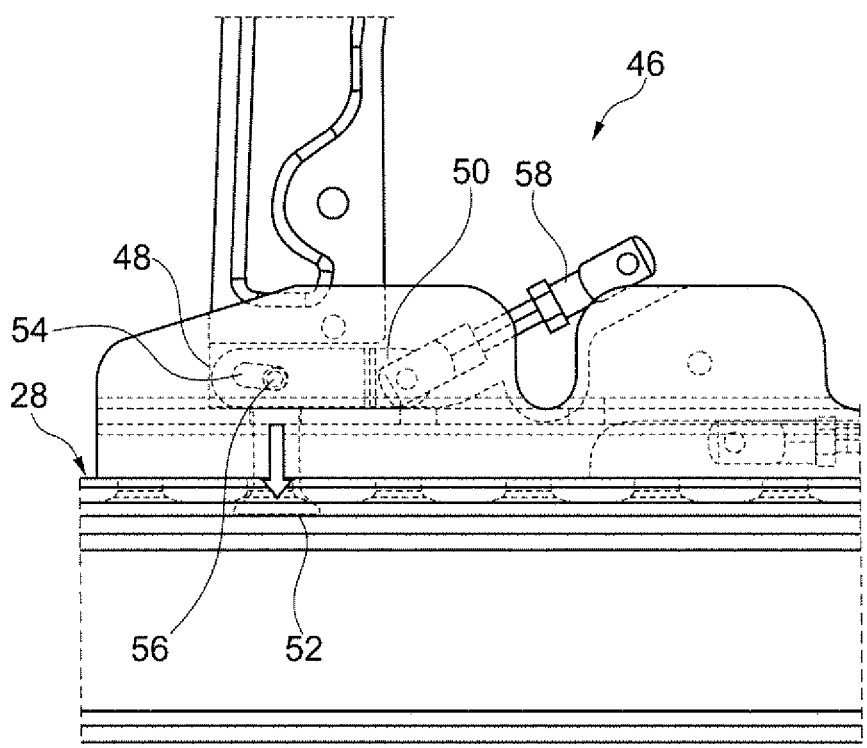
FIG. 5: a front part of the locking apparatus in the open state.

FIG. 5 shows the front fitting 46 in an open state in which the operating element 50 has been slid relative to the base body 48 such that the second locking body 52 has been moved, away from the top 28 of the seat rail 14, into the interior of the seat rail 14 so that the front end of the seat may now be slid along the seat rail 14.

Figure 6:
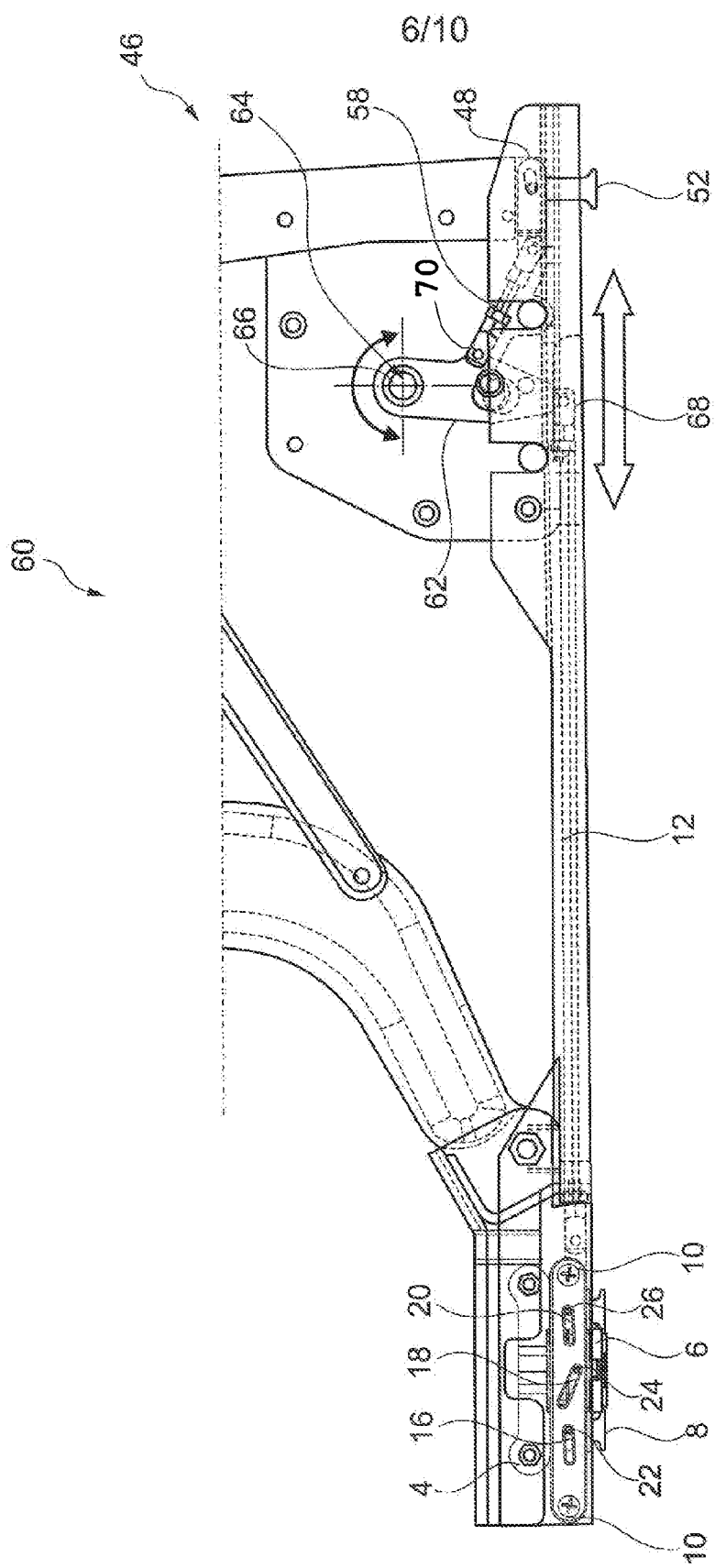
FIG. 6: an overall view of the locking apparatus according to the present invention.

FIG. 6 shows an overall view of the locking apparatus 60 according to the present invention with a rear fitting 2 and a front fitting 46, wherein the levers 12 and 58 are arranged on a shared drive lever 62. On one point 64 the drive lever 62 is rotatably held to a shaft 66 so that rotation of the shaft 66 causes movement of the levers 12 and 58, with the result that the first operating element 10 and the second operating element 50 are moved in unison. The drive lever 62 comprises an attachment point 68 for the lever 12 that is spaced apart from the shaft 66 further away than is an attachment point 70 for the lever 58. Consequently, the lengths of the slits in the first and in the second operating element 10 and 50 may be dimensioned individually, and the movement necessary for operation may be taken into account by the spacing of the attachment points 68 and 70 from the shaft 66. The illustration in FIG. 6 shows that when the shaft 66 rotates the first and the second operating elements 10 and 50 are moved, and consequently both the rear fitting 2 and the front fitting 46 are undone. No further manual operating steps are necessary to undo the locked seat from the seat rail 14, so that the locking apparatus 60 according to the present invention provides a very large advantage when compared to all the known locking apparatuses for seats or other objects that may be affixed to seat rails.

Figure 7:
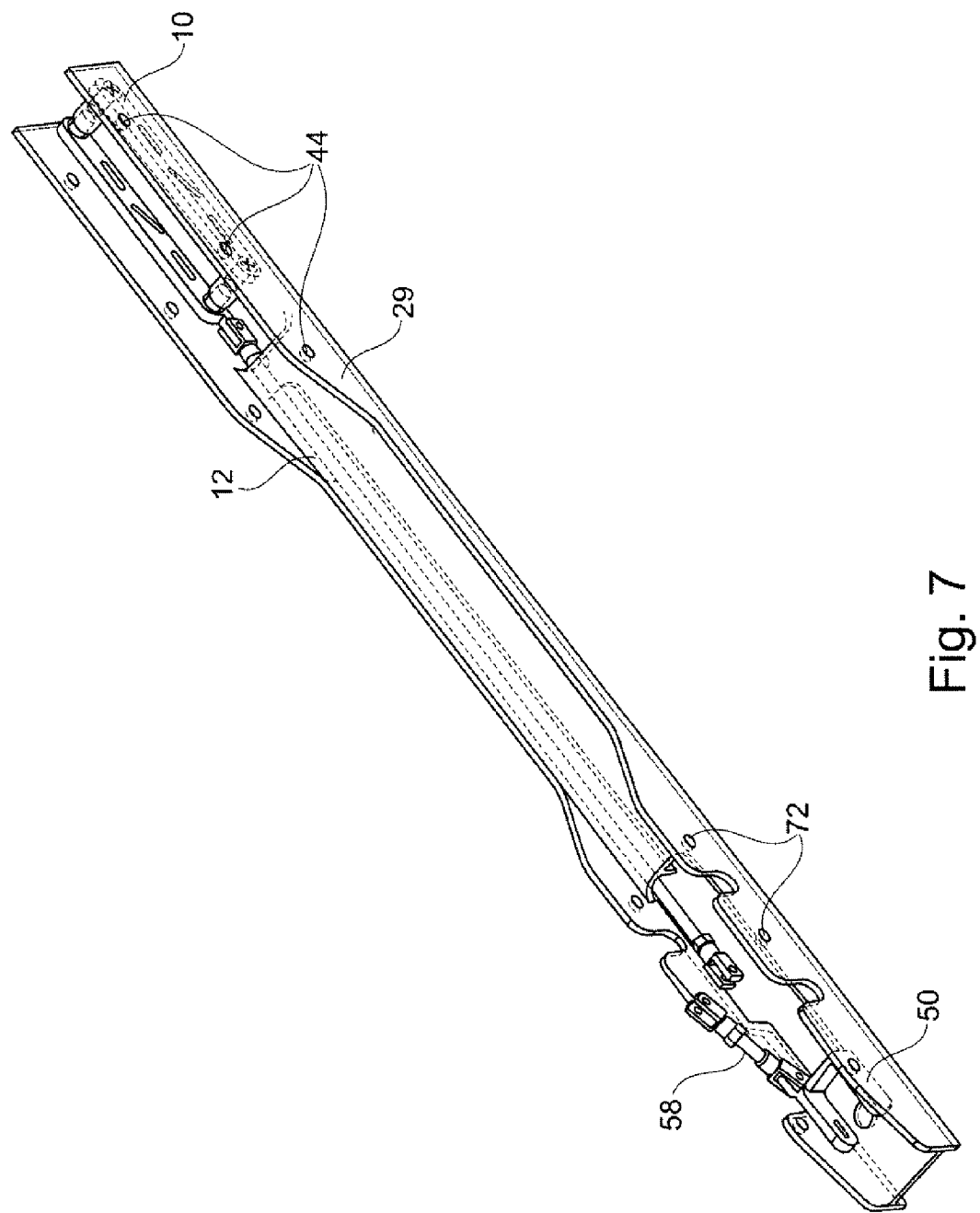
FIG. 7: a diagrammatic view of the arrangement comprising levers and operating elements.

Furthermore, FIG. 7 clarifies the interaction between or among the frame 29, the levers 12 and 58 and the operating elements 10 and 50. In the region of the rear fitting 2 a rear seat leg may be attached, while in the region of the front fitting 46 a front seat leg may be attached. To this effect the frame 29 comprises corresponding openings 44 or 72.

Figure 8A:
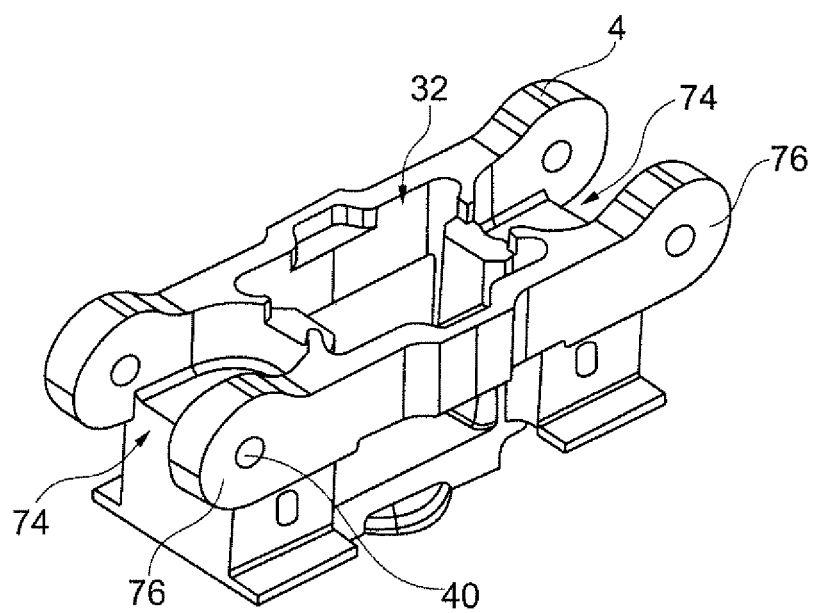
FIG. 8a: a three-dimensional view of the first base body.
Figure 8B:
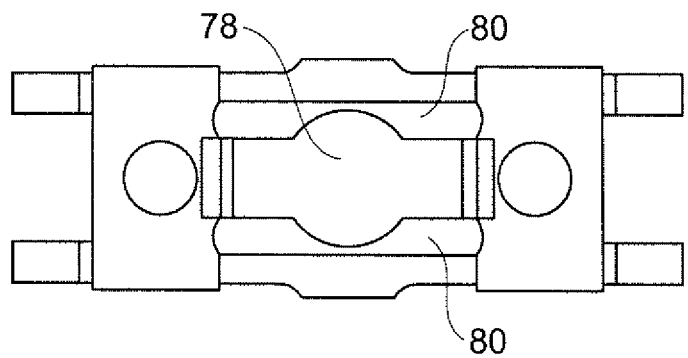
FIG. 8b: a horizontal projection of the underside of the first base body.
Figure 8C:
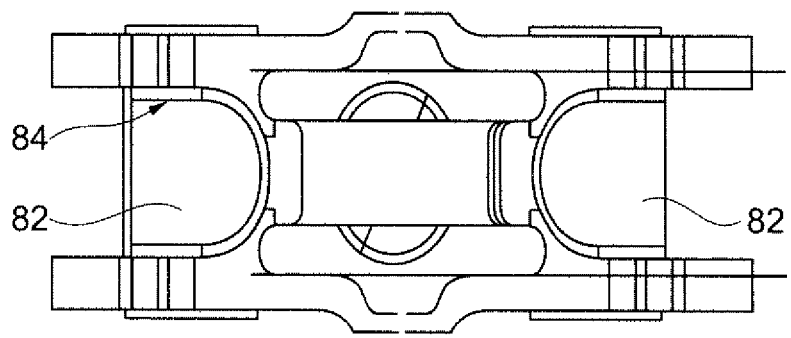
FIG. 8c: a horizontal projection of the top of the first base body.
Figure 11:
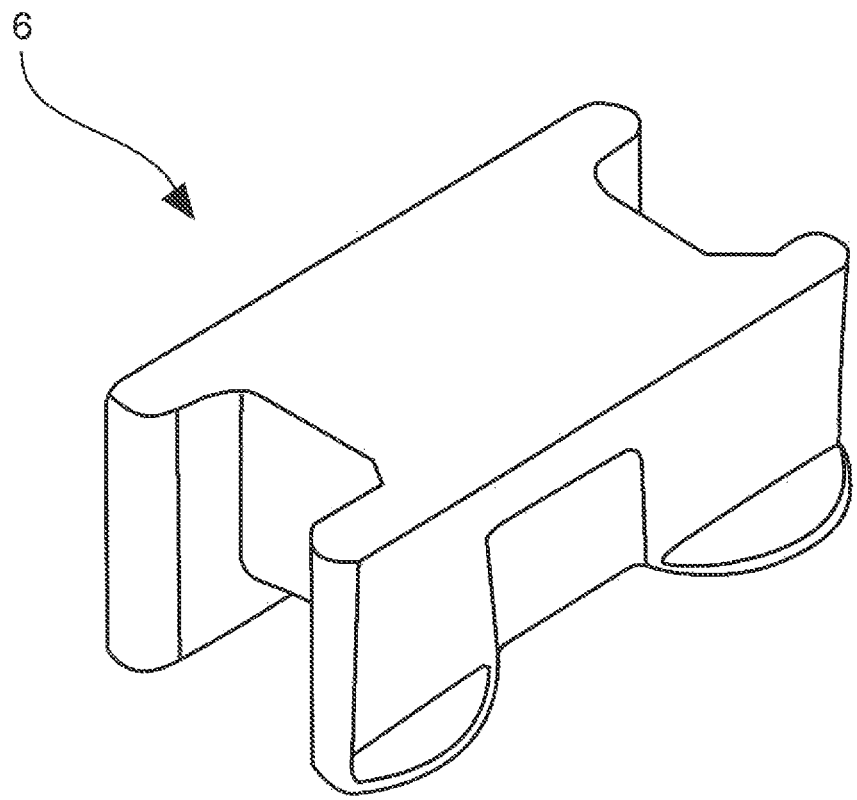
FIG. 11: a three-dimensional view of a plunging body.

In order to illustrate a possible design of a base body, as an example a base body 4 is shown in a three-dimensional view in FIG. 8*a*. The base body 4 comprises two clearances 74 that are arranged between two arms 76 which comprise holes 40 to accommodate attachment means for a rear seat leg. Furthermore, the base body 4 comprises an opening 32 that may be closed off by a cover 34 (not shown). In this opening, which extends to a lower end of the base body 4, a plunging body 6 see FIG. 11) may be movably held. On the lower end of the base body 4 the opening 32 is blocked by an end stop 78 that is shown in FIG. 8*b* so that only two flat projections or the like of a plunging body may reach through the remaining slits 80 in the opening 32. With a corresponding design of the opening 32 and of the end stop 78 a plunging body 6 may be implemented that may establish an ideal positive-locking connection with a seat rail 14. The opening 32 or the two slits 80 must be designed in such a way that easy movement of the plunging body 6 may be implemented. Between the arms 76, on the top of the base body 4 shown in FIG. 8*c*, in each case a recess 82 is arranged into which corresponding elements of the rear seat end may be placed. Preferably, the recesses 82 are designed in such a way that the rear seat end that is to be integrated in that location, guided by sidewalls 84 of the recesses 82, attains a defined position.

Figure 9:
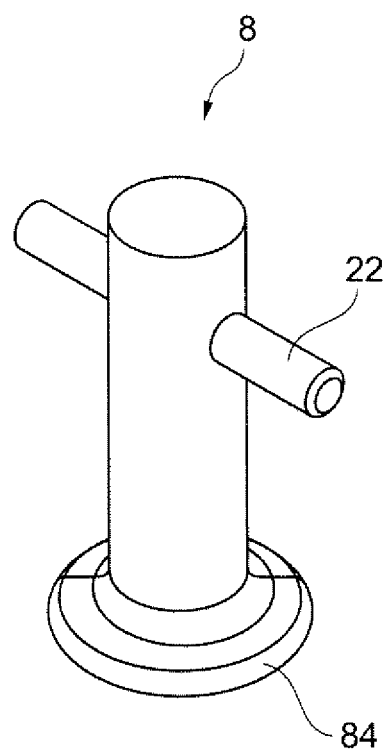
FIG. 9: a three-dimensional view of a first locking body with an inserted pin.

FIG. 9 shows a locking body 8 that comprises a pin 22. At the end that points away from the pin 22 the locking body 8 comprises a plate-shaped region 84 that may be movably held within a seat rail 40, and that may also be locked in corresponding seat positions.

Figure 10:
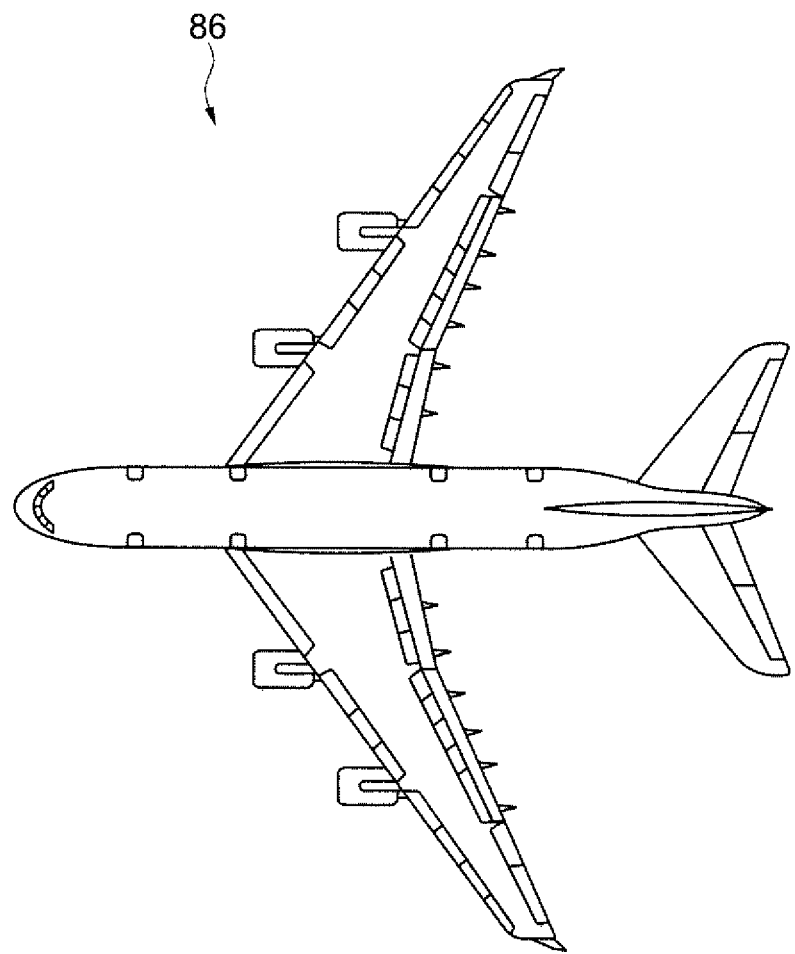
FIG. 10: an aircraft comprising at least one rail and at least one object that may be locked on the rail.

Finally, FIG. 10 shows an aircraft 86 that comprises at least one rail and at least one object that may be locked on said rail.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Rear fitting
4 First base body
6 Plunging body
8 First locking body
10 First operating element
12 Lever
14 Seat rail/rail
16 Slit
18 Slit
20 Slit
22 Pin
24 Pin
26 Pin
28 Top of the seat rail
29 Frame
30 Rear seat leg
32 Top opening
34 Cover
36 Bolt
38 Hole
40 Opening
42 Bolt
44 Hole
46 Front fitting
48 Second base body
50 Second operating element
52 Second locking body
54 Slit
56 Pin
58 Lever
60 Locking apparatus
62 Drive lever
64 (Bearing) point
66 Shaft
68 Attachment point
70 Attachment point
72 Opening
74 Clearance
76 Arm
78 End stop
80 Slit
82 Recess
84 Sidewall of the recess
86 Aircraft

The invention claimed is:

1. A locking apparatus for an object that is lockable to a rail, comprising:
   a first fitting configured to be located at a first end of the object and comprising at least one first base body;
   a second fitting configured to be located at a second end of the object and comprising at least one second base body;
   at least one first locking body movably arranged on the at least one first base body;
   at least one second locking body movably arranged on the at least one second base body;
   at least one first operating element movably held on the at least one first base body; and
   at least one second operating element movably held on the at least one second base body; and
   at least one plunging body movably held on or relative to the at least one first base body;
   wherein the at least one first base body and the at least one second base body are configured to be placed at least on the top of the rail;
   wherein the at least one first locking body comprises a shape configured to put the at least one first locking body into place in the rail;
   wherein the at least one second locking body comprises a shape configured to put the at least one second locking body into place in the rail;
   wherein the at least one first operating element is connected to the at least one first locking body for moving the at least one first locking body in the direction of an interior of the rail,
   wherein the at least one second operating element is connected to the at least one second locking body for moving the at least one second locking body in the direction of the interior of the rail;
   wherein the at least one first and the at least one second operating elements are configured to move longitudinally along a longitudinal direction of extension of the rail relative to the at least one first base body and the at least one second base body, respectively, during a locking operation or an unlocking operation;
   wherein the at least one first operating element and the at least one second operating element are interconnected and are configured to be operated in unison; and
   wherein, in a first operational mode, the at least one plunging body is movable in a direction of the interior of the rail away from the top of the rail, and in a second operational mode, the at least one plunging body is movable out of the interior of the rail toward the top of the rail;
   wherein the at least one first operating element comprises:
   a first slit for guiding the at least one first locking body; and
   a second slit for guiding the at least one plunging body,
   wherein the first slit and the second slit are so oriented that a movement of the operating element along the rail is configured to cause the at least one locking body and the at least one plunging body to move in an opposite direction of one another.

2. The locking apparatus of claim 1, wherein the at least one plunging body is connected to the at least one first operating element.

3. The locking apparatus of claim 1, wherein the at least one second operating element comprises at least one slit for guiding at least one projection of the at least one second locking body.

4. The locking apparatus of claim 1, wherein the at least one first operating element and the at least one second operating element are connected to a drive lever that is rotatably held at a point.

5. The locking apparatus of claim 1, wherein upon actuation of the at least one first operating element, the at least one first locking body and the at least one plunging body move in opposite directions to each other with respect to the rail.

6. The locking apparatus of claim 1, further comprising:
   a first lever coupled to the at least one first operating element;
   a second lever coupled to the at least one second operating element; and
   a drive lever coupled to the first lever and the second lever.

7. The locking apparatus of claim 6, further comprising a shaft coupled to the drive lever;
   wherein a rotation of the shaft is configured to cause a movement of the first lever and the second lever via the drive lever, thereby moving the at least one first operating element and the at least one second operating element in unison.

8. A means of transport comprising at least one object that is lockable to a rail and at least one locking apparatus comprising:

a first fitting located at a first end of the object and comprising at least one first base body;

a second fitting located at a second end of the object and comprising at least one second base body;

at least one first locking body movably arranged on the at least one first base body;

at least one second locking body movably arranged on the at least one second base body;

at least one first operating element movably held on the at least one first base body;

at least one second operating element movably held on the at least one second base body; and at least one plunging body movably held on or relative to the at least one first base body;

wherein the at least one first base body and the at least one second base body are configured to be placed at least on the top of the rail;

wherein the at least one first locking body comprises a shape configured to put the at least one first locking body into place in the rail;

wherein the at least one second locking body comprises a shape configured to put the at least one second locking body into place in the rail;

wherein the at least one first operating element is connected to the at least one first locking body for moving the at least one first locking body in the direction of an interior of the rail;

wherein the at least one second operating element is connected to the at least one second locking body for moving the at least one second locking body in the direction of the interior of the rails;

wherein the at least one first and at least one second operating elements are configured to move longitudinally along a longitudinal direction of extension of the rail relative to the at least one first base body and the at least one second base body, respectively, during a locking operation or an unlocking operation;

wherein the at least one first operating element and the at least one second operating element are interconnected and are configured to be operated in unison; and wherein, in a first operational mode, the at least one plunging body is movable in a direction of the interior of the rail away from the top of the rail, and in a second operational mode, the at least one plunging body is movable out of the interior of the rail toward the top of the rail;

wherein the at least one first operating element comprises:
a first slit for guiding the at least one first locking body; and
a second slit for guiding the at least one plunging body,
wherein the first slit and the second slit are so oriented that a movement of the operating element along the rail is configured to cause the at least one locking body and the at least one plunging body to move in an opposite direction of one another.

9. The means of transport of claim 8, wherein the means of transport is an aircraft.

\* \* \* \* \*